United States Patent [19]

Inagami

[11] 4,173,694

[45] Nov. 6, 1979

[54] POLYCHLOROPRENE RUBBER COMPOSITION

[75] Inventor: Masaaki Inagami, Kamakura, Japan

[73] Assignee: Nippon Zeon Co., Ltd., Tokyo, Japan

[21] Appl. No.: 923,584

[22] Filed: Jul. 11, 1978

[30] Foreign Application Priority Data

Jul. 22, 1977 [JP] Japan .................................. 52-88006

[51] Int. Cl.$^2$ .......................... C08K 5/37; C08J 3/24; C08F 8/34; C08F 8/32
[52] U.S. Cl. ................................... 525/351; 525/350; 525/346
[58] Field of Search ................................... 526/33, 35

[56] References Cited

U.S. PATENT DOCUMENTS

| | | | |
|---|---|---|---|
| 2,804,450 | 8/1957 | Naylor | 526/35 |
| 3,366,598 | 1/1968 | Westlinning et al. | 526/35 |
| 3,816,323 | 6/1974 | Kempermann et al. | 526/35 |

FOREIGN PATENT DOCUMENTS

51-55347 5/1976 Japan.

*Primary Examiner*—William F. Hamrock
*Attorney, Agent, or Firm*—Sherman & Shalloway

[57] ABSTRACT

The defects (i.e., the slow vulcanization speeds and the mold corroding tendency) of a known curable composition comprising (1) a polychloroprene rubber and (2) a di- or tri-mercapto-s-triazine compound can be remedied by a novel composition comprising the known composition and (3) a specified polyalkylene polyamine. The novel composition comprises 100 parts by weight of (1), 0.1 to 3 parts by weight of (2) and 0.1 to 2 parts by weight of (3).

3 Claims, No Drawings

POLYCHLOROPRENE RUBBER COMPOSITION

This invention relates to a polychloroprene rubber composition comprising polychloroprene rubber, a di- or tri- mercapto-s-triazine compound and a polyalkylene polyamine.

Heretofore, 2-mercaptoimidazoline has been used as the most suitable vulcanization agent for polychloroprene rubbers. The toxicity hazard of ethylenethiourea, however, has made it necessary to find out a feasible substitute for 2-mercaptoimidazoline. In an attempt to meet this need, mono-, di- or tri-mercapto-s-triazine compounds have been developed, and, for example, U.S. Pat. No. 2,804,450 discloses the use of these compounds as a vulcanizing agent for polychloroprene rubber. The di- and tri-mercapto-s-triazine compounds unfortunately have the serious defect that they have a slower speed of vulcanizing polychloroprene rubber than 2-mercaptoimidazoline and thus have poor productivity (molding speed), and moreover, considerably corrode molds.

It is an object of this invention therefore to provide a polychloroprene rubber composition which in spite of containing a di- or tri-mercapto-s-triazine compound, can be rapidly cured and does not corrode molds.

The present inventor has found that this object can be achieved by incorporating a specified polyalkylene polyamine compound in a curable composition comprising a polychloroprene rubber and a di- or tri-mercapto-s-triazine compound.

According to this invention, there is provided a curable polychloroprene rubber composition comprising (1) 100 parts by weight of a polychloroprene rubber, (2) 0.1 to 3 parts by weight of a di- or tri-mercapto-s-triazine compound and (3) 0.1 to 2 parts by weight of a polyalkylene polyamine.

The "polychloroprene rubber", as used herein, denotes a homopolymer of 2-chlorobutadiene-1,3, or a copolymer of it with a monomer copolymerizable with it, and includes any polymeric rubbers which contain active chlorine of the allyl chloride type in the polymer chain.

The di- or tri-mercapto-s-triazine compound as a vulcanizing agent for the polychloroprene rubber is used in an amount of 0.1 to 3 parts by weight, preferably 0.6 to 1.2 parts by weight, per 100 parts by weight of the rubber. Suitable triazine compounds include trithiocyanuric acid, monoalkali metal salts of trithiocyanuric acid, and monoalkali metal salts of 2-substituted-4,6-dimercapto-s-triazines. Specific examples are trithiocyanuric acid, monosodium or monopotassium trithiocyanurate, a monosodium salt or monopotassium salt of 2-methoxy-4,6-dimercapto-s-triazine, a monosodium salt or monopotassium salt of 2-ethoxy-4,6-dimercapto-s-triazine, a monosodium salt or monopotassium salt of 2-morpholino-4,6-dimercapto-s-triazine, and a monosodium salt or monopotassium salt of 2-phenoxy-4,6-dimercapto-s-triazine.

Hexamethylene tetramine and triethylene tetramine are examples of the polyalkylene polyamine compound used in this invention. The amount of the polyalkylene polyamine is 0.1 to 2 parts by weight, preferably 0.5 to 1 part by weight, per 100 parts by weight of the polychloroprene rubber. The vulcanization of rubber tends to be faster as the amount of the polyalkylene polyamine increases. When the amount of this compound exceeds 2 parts by weight, scorching occurs. Amounts of less than 0.1 part by weight produce only an insufficient effect.

If required, at least one compound of a metal of Group IIA or IIB of the periodic table may further be added as a vulcanization promotor together with the di- or tri-mercapto-s-triazine compound. Typical examples of the vulcanization promotor are oxides such as magnesium oxide, calcium oxide and zinc oxide; hydroxides such as magnesium hydroxide, calcium hydroxide and zinc hydroxide; carbonates such as magnesium carbonate, calcium carbonate and zinc carbonate; and organic acid salts such as magnesium acetate, calcium laurate, zinc stearate, calcium benzoate and zinc benzoate. The amount of the vulcanization promotor is 0 to 20 parts by weight, preferably 3 to 10 parts by weight, per 100 parts by weight of the polychloroprene rubber.

If further required, the composition of this invention may contain ordinary compounding agents such as reinforcing agents, fillers, softening agents, plasticizers and antioxidants.

The composition of this invention can be vulcanized in a customary manner, and for example, heating of the composition to 80° to 200° C. can afford a vulcanized product.

The following Examples illustrate the present invention specifically.

In these examples, all parts are by weight.

EXAMPLE 1

Compositions were prepared by mixing various ingredients on mixing rolls at 60° C. in accordance with the recipes shown in Table 1.

The vulcanization speed at 155° C. of each of the compositions was measured by an oscillating disc rheometer (a product of Toyo Seiki K.K.). Ten samples of each composition were vulcanized successively at 155° C. for 30 minutes in the same mold made of SUS stainless steel, and after the vulcanization of the last sample, the corrosion of the mold was examined.

The corrosion of the mold was evaluated on the following ratings, and the results are shown in Table 1.

| Rating | Standard of evaluation |
|---|---|
| 0 | No corrosion occurred. |
| 1 | Corrosion scarcely occurred. |
| 2 | Corrosion occurred slightly, but no unevenness of the mold surface could be perceived visually. |
| 3 | Corrosion occurred to such an extent that slight unevenness of the mold surface could be perceived. |
| 4 | Corrosion occurred to such an extent that much unevenness of the mold surface could be perceived. |
| 5 | Corrosion occurred heavily to such an extent that unevenness could be perceived all over the mold surface. |

Table 1

| Run No. | Controls | | | | | | | | | Invention | |
|---|---|---|---|---|---|---|---|---|---|---|---|
| Compounding recipe (parts) | 1 | 2 | 3 | 4 | 5 | 6 | 7 | 8 | 9 | 10 | 11 |
| Polychloroprene rubber (*1) | | | | | | 100 | | | | | |
| Stearic acid | | | | | | 0.5 | | | | | |

Table 1-continued

| Run No. Compounding recipe (parts) | Controls | | | | | | | | | Invention | |
|---|---|---|---|---|---|---|---|---|---|---|---|
| | 1 | 2 | 3 | 4 | 5 | 6 | 7 | 8 | 9 | 10 | 11 |
| SRF carbon black | | | | | | 40 | | | | | |
| Magnesium oxide | | | | | | 4 | | | | | |
| Zinc oxide | | | | | | 5 | | | | | |
| 2-Mercaptoimidazoline | 0.5 | — | — | — | — | — | — | — | — | — | — |
| Trithiocyanuric acid | — | 0.5 | 1.0 | 1.5 | 0.9 | 0.9 | 0.9 | 0.9 | 0.9 | 0.9 | 0.9 |
| n-Butyl aldehyde aniline (*2) | — | — | — | — | 1.0 | — | — | — | — | — | — |
| Di-ortho-tolyl guanidine salt of dicatechol borate (*3) | — | — | — | — | — | 1.0 | — | — | — | — | — |
| 2-(N,N-diethylthiocarbamoylthio) benzothiazole (*4) | — | — | — | — | — | — | 1.0 | — | — | — | — |
| Tetramethylthiuram disulfide | — | — | — | — | — | — | — | 1.0 | — | — | — |
| Dicyclohexylamine | — | — | — | — | — | — | — | — | 1.0 | — | — |
| Hexamethylene tetramine | — | — | — | — | — | — | — | — | — | 1.0 | — |
| Triethylene tetramine | — | — | — | — | — | — | — | — | — | — | 1.0 |
| Vulcanization speed | | | | | | | | | | | |
| t-20 (minutes) (*5) | 5.2 | 16.5 | 9.7 | 8.1 | 8.6 | 4.4 | 7.5 | 4.3 | 2.5 | 6.1 | 5.0 |
| t-40 (minutes) (*6) | 18.5 | <50 | 25.0 | 25.0 | 19.5 | 10.5 | 17.5 | 17.6 | 3.6 | 16.4 | 17.5 |
| Corrosion of molds | 0 | 2 | 3 | 5 | 4 | 2 | 5 | 5 | 2 | 0 | 0 |

(*1) "NEOPRENE WRT", a product of Showa Neoprene Co., Ltd.
(*2) "NOCCELER-8", a vulcanization accelerator, a product of Ouchi Shinko Kagaku Kogyo K.K.
(*3) "NOCCELER-PR", a vulcanization accelerator, a product of Ouchi Shinko Kagaku Kogyo K.K.
(*4) "NOCCELER-64", a vulcanization accelerator, a product of Ouchi Shinko Kagaku Kogyo K.K.
(*5) and (*6) "t-20 (minutes)" indicates the time which elapses until the torque value rises by 20 kg.cm from the minimum torque value; and "t-40 (minutes)" denotes the time which elapses until the torque value rises by 40 kg.cm from the minimum torque value. The shorter these times, the faster is the speed of vulcanization.

It is seen from the results of Runs Nos. 2 to 4 that the speed of vulcanization of a control composition comprising 100 parts by weight of rubber and 0.5 to 1.5 parts by weight of trithiocyanuric acid is faster as the amount of trithiocyanuric acid increases, but at the same time, corrosion of the mold increases. In contrast, as is seen from the results of Runs Nos. 10 and 11, the composition of this invention comprising rubber, trithiocyanuric acid and polyalkylene polyamine can be cured at a faster speed and yet the corrosion of the mold can be prevented almost completely. It is also seen from the results of Runs Nos. 5 to 9 that in the case of control compositions containing various additives other than the polyalkylene polyamine in addition to rubber and trithiocyanuric acid, the speed of vulcanization is increased, but no effect of preventing corrosion of molds can be noted.

EXAMPLE 2

Compositions were prepared by mixing various ingredients on mixing rolls at 60° C. in accordance with the recipes shown in Table 2, and tested in the same way as in Example 1. Each of the vulcanized products obtained by heating at 155° C. for 30 minutes was examined for its properties in accordance with JIS K-6301. The results are shown in Table 2.

Table 2

| Run No. Compounding recipe (parts) | Control | | Invention | | | Control | Invention | Control | Invention | |
|---|---|---|---|---|---|---|---|---|---|---|
| | 12 | 13 | 14 | 15 | 16 | 17 | 18 | 19 | 20 | 21 |
| Polychloroprene rubber | | | | | | 100 | | | | |
| Stearic acid | | | | | | 0.5 | | | | |
| Zinc oxide | | | | | | 5 | | | | |
| Magnesium oxide | | | | | | 4 | | | | |
| SRF carbon black | | | | | | 50 | | | | |
| Process oil (*7) | | | | | | 10 | | | | |
| Phenyl-β-naphthylamine | | | | | | 2 | | | | |
| 2-Mercaptoimidazoline | 0.5 | — | — | — | — | — | — | — | — | — |
| Trithiocyanuric acid | — | 0.9 | 0.9 | 0.9 | 0.9 | 0.9 | 1.8 | 3.6 | 0.9 | 0.9 |
| Hexamethylene tetramine | — | — | 0.4 | 0.8 | 1.6 | 2.4 | 0.4 | 0.4 | — | — |
| Triethylene tetramine | — | — | — | — | — | — | — | — | 0.8 | 1.6 |
| Vulcanization speed | | | | | | | | | | |
| t-20 (minutes) | 6.7 | 7.5 | 6.9 | 6.5 | 5.2 | 1.1 | 6.6 | 1.8 | 3.5 | 3.0 |
| t-40 (minutes) | 13.8 | 20.0 | 15.2 | 14.0 | 12.1 | 3.0 | 13.9 | 2.9 | 8.4 | 6.8 |
| Corrosion of molds | 0 | 5 | 1 | 0 | 0 | 2 | 0 | 3 | 0 | 1 |
| Properties of vulcanized products in normal condition | | | | | | | | | | |
| Tensile strength (kg/cm$^2$) | 193 | 185 | 175 | 168 | 172 | 137 | 146 | 121 | 169 | 154 |
| Elongation (%) | 470 | 580 | 470 | 430 | 380 | 280 | 300 | 180 | 400 | 350 |
| Hardness (JIS) (points) | 55 | 50 | 53 | 57 | 58 | 58 | 59 | 63 | 57 | 58 |

(*7) "Circo Light", a product of Sun Oil Co.

It is seen from the results of Runs Nos. 14, 15, 16, 18, 20 and 21 that the compositions of this invention bring about an improvement in the speed of vulcanization and an effect of preventing corrosion of molds. On the other hand, in the case of the control composition in Run No. 17 which contains more than 2 parts by weight of the polyalkylene polyamine per 100 parts by weight of rubber, a phenomenon of abrupt occurrence of vulcanization takes place. In the case of the control composition in Run No. 19 containing more than 3 parts by weight of trithiocyanuric acid per 100 parts by weight of rubber the phenomenon of abrupt occurrence of vulcanization takes place, and the resuting vulcanized product has an extremely low elongation and poor properties.

EXAMPLE 3

Compositions were prepared by mixing various ingredients on mixing rolls at 60° C. in accordance with the recipes shown in Table 3, and tested in the same way as in Example 1. The results are shown in Table 3.

Table 3

| Compounding recipe (parts) | Run No. | Control 22 | Invention 23 | Control 24 | Invention 25 | Control 26 | Invention 27 |
|---|---|---|---|---|---|---|---|
| Polychloroprene rubber | | | | 100 | | | |
| Stearic acid | | | | 0.5 | | | |
| Zinc oxide | | | | 5 | | | |
| Magnesium oxide | | | | 4 | | | |
| SRF carbon black | | | | 40 | | | |
| Phenyl-β-naphthylamine | | | | 2 | | | |
| Monosodium trithiocyanurate | | 1.0 | 1.0 | — | — | — | — |
| Monosodium salt of 2-methoxy-4,6-dimercapto-s-triazine | | — | — | 1.0 | 1.0 | — | — |
| Monosodium salt of 2-morpholino-4,6-dimercapto-s-triazine | | — | — | — | — | 1.0 | 1.0 |
| Hexamethylenetetramine | | — | 1.0 | — | 1.0 | — | 1.0 |
| Vulcanization characteristics | | | | | | | |
| t-10 (minutes) | | 8.5 | 5.9 | 8.1 | 5.0 | 7.3 | 4.8 |
| t-20 (minutes) | | 20.3 | 17.4 | 19.2 | 16.1 | 17.5 | 14.3 |
| Mold corrosion | | 3 | 0 | 3 | 1 | 4 | 1 |

It is seen from Table 3 that even when a monoalkali metal salt of trithicyanuric acid or a monoalkali metal salt of a 2-substituted-4,6-dimercapto-s-triazine is used, the effect of improving the speed of vulcanization and of preventing mold corrosion can be obtained by using a polyalkylene polyamine together in accordance with this invention.

What we claim is:

1. A polychloroprene rubber composition comprising 100 parts by weight of a polychloroprene rubber, 0.1 to 3 parts by weight of a di- or tri-mercapto-s-triazine compound, and 0.1 to 2 parts by weight of a polyalkylene polyamine.

2. The composition of claim 1 wherein the di- or tri-mercapto-s-triazine compound is at least one compound selected from the group consisting of trithiocyanuric acid, monoalkali metal salts of trithiocyanuric acid and monoalkali metal salts of 2-substituted-4,6-dimercapto-s-triazines.

3. The composition of claim 1 wherein the polyalkylene polyamine is hexamethylene tetramine or triethylene tetramine.

* * * * *